United States Patent [19]

Klobucar et al.

[11] Patent Number: 4,923,954
[45] Date of Patent: May 8, 1990

[54] PRODUCTION OF PARTICULATE POLYIMIDE POLYMERS

[75] Inventors: W. Dirk Klobucar; Adam Nugent, Jr.; Ronald C. Zumstein, all of Baton Rouge, La.

[73] Assignee: Ethyl Corporation, Richmond, Va.

[21] Appl. No.: 289,028

[22] Filed: Dec. 23, 1988

[51] Int. Cl.$^5$ ............................................. C08G 69/26
[52] U.S. Cl. ................................... 528/183; 528/125; 528/126; 528/128; 528/176; 528/229; 528/353
[58] Field of Search ............... 528/176, 183, 353, 229, 528/125, 126, 128

[56] References Cited

U.S. PATENT DOCUMENTS 4,760,126  7/1988  Numata et al. ..................... 528/353

FOREIGN PATENT DOCUMENTS 1062435  3/1967  United Kingdom .

Primary Examiner—John Kight, III
Assistant Examiner—M. L. Moore
Attorney, Agent, or Firm—Richard J. Hammond; John F. Sieberth

[57] ABSTRACT

Described is a process for producing, in particulate form, aromatic polyimides based on one or more 2,2-bis[4-(aminophenoxy)phenyl]hexafluoropropanes. The process involves forming a solution of an equimolar mixture of (1) an aromatic tetracarboxylic dianhydride and (2) a 2,2-bis[4-(aminophenoxy)phenyl]hexafluoropropane as the sole or predominant aromatic diamine in (3) a solvent composed of (i) tetrahydrofuran, or (ii) one or more alkyltetrahydrofurans having a normal boiling point below 100° C., or (iii) a mixture of (i) and (ii), and heating and agitating such solution in a closed reaction system under super-atmospheric pressure such that a separate phase of particulate aromatic polyimide is formed. The process avoids difficulties caused by the tendency of the wet polyimide polymer to agglomerate into stringy or tacky masses which can foul reactor and agitator surfaces.

18 Claims, No Drawings ately low temperatures in a suitable solvent, typically a dipolar aprotic solvent such as N-methylpyrrolidone or N,N-dimethylacetamide, an aromatic polyamic
PRODUCTION OF PARTICULATE POLYIMIDE POLYMERS

TECHNICAL FIELD

This invention relates to production of finely divided polyimide polymers suitable for use in forming composites and molded products.

BACKGROUND

Aromatic polyimides are normally prepared from an aromatic tetracarboxylic dianhydride and an aromatic primary diamine. When these materials are reacted at relatively low temperatures in a suitable solvent, typically a dipolar aprotic solvent such as N-methylpyrrolidone or N,N-dimethylacetamide, an aromatic polyamic acid is formed, usually as a viscous solution sometimes referred to as a varnish. When heated to a temperature above about 140° C. imidization occurs such that a polyimide polymer is formed.

It is known from Japan Kokai No. 57-200452 and Japan Kokai No. 57-200453 that finely divided aromatic polyimides of a variety of aromatic tetracarboxylic acids and aromatic diamines can be formed by rapidly heating to 160°–300° C. solutions of carboxy anhydride group-free polymers in a polar organic solvent such as N-methylpyrrolidone, N,N-dimethylformamide, etc. In this way, polyimide powders suitable for use in compression molding were formed from solutions of such copolymers as 3,3',4,4'-biphenyltetracarboxylic acid-4,4'-diaminodiphenyl ether copolymer, pyromellitic acid-4,4'-diaminodiphenyl ether copolymer, and 3,3',4,4'-biphenyltetracarboxylic acid-4,4'-diaminodiphenylmethane copolymer.

Polyimide polymers based on use of 2,2-bis[4-(4-aminophenoxy)phenyl]hexafluoropropane as the sole or predominant aromatic primary diamine are of considerable interest because of their desirable high temperature properties. However the production of such polymers in powder form presents a number of problems. Certain prior methods for converting the polyamic acid to the corresponding polyimide yield the polyimide in the form of solids which require extensive grinding, and substantial portions of the product may not even be amenable to grinding. Other prior methods are fraught with difficulties caused by the tendency of the wet polyimide polymer to agglomerate into stringy or tacky masses which can foul reactor and agitator surfaces. Further, such tacky masses cannot be removed from the reactor in any commercially practical manner. Moreover, the solvent tends to remain occluded in such swollen, tacky masses.

A desirable contribution to the art would be a process in which such difficulties may be eliminated, or at least greatly reduced. This invention is deemed to constitute such a contribution

THE INVENTION

This invention provides a process for the production, in particulate form, of aromatic polyimides derived from a 2,2-bis[4-(aminophenoxy)phenyl]hexafluoropropane as the sole or predominant aromatic primary diamine component thereof, which process comprises forming a solution of a substantially equimolar mixture of (1) an aromatic tetracarboxylic dianhydride and (2) a 2,2-bis[4-(aminophenoxy)phenyl]hexafluoropropane as the sole or predominant aromatic diamine in (3) a solvent composed of (i) tetrahydrofuran, or (ii) one or more alkyltetrahydrofurans having a normal boiling point below 100° C., or (iii) a mixture of (i) and (ii), and heating and agitating such solution in a closed reaction system under super-atmospheric pressure such that a separate phase of particulate aromatic polyimide is formed therein. In one of its preferred forms the process comprises (a) forming a homogeneous solution from reactants (1) and (2) above in from about 5 to about 50 parts (preferably about 5 to about 20 parts) by weight of such solvent per part by weight of reactants (1) and (2) combined; and (b) heating such solution with agitation in a closed reaction system under super-atmospheric pressure and to a temperature sufficient to cause imidization and formation of a separate phase of particulate aromatic polyimide. The process is conducted such that water formed during the imidization remains within the reaction system.

The use of the above solvent system enables the reaction intermediates to remain in solution prior to imidization. And, when the imidization reaction has been fully or partially completed, the polyimide polymer is produced in finely divided form. The formation of objectionable agglomerates or stringy taffy-like residues is thus avoided, and the reaction mixture can easily be removed, as by draining the reactor.

In a preferred embodiment, a homogeneous solution in (a) above is formed and heated in at least two stages (at least one of which is in (b) above) with stirring or other forms of agitation. In one or more initial stages the temperature of the mixture is raised from ambient (e.g., room) temperature up to about 140° C., and in one or more subsequent stages in (b) the temperature of the mixture is raised to between about 140° and about 210° C. The order of addition of the components to the reactor is not critical, and one or more of them may be added portionwise if desired. Preferably the reactor is charged at ambient temperatures at the outset, the reactor is then sealed and the temperature is increased to the desired temperature while suitably agitating the mixture to achieve and maintain homogeneity.

The aromatic tetracarboxylic acid dianhydrides used in the process are co-reactive with 2,2-bis[4-(aminophenoxy)phenyl]hexafluoropropanes to produce a polyimide presumably with a polyamic acid being formed as a reaction intermediate. A feature of this invention is that no reaction intermediate need be recovered or isolated, and the entire reaction can be, and preferably is, conducted in the same reactor, in effect as a unit operation.

Among the features of this invention is the finding that the particle sizes of the polyimide powders which are formed in the tetrahydrofuran reaction systems used are extremely small—typically with at least 90% of the particles being less than 50 microns, with an average particle size of about 20 microns or less. Thus this invention makes it possible to produce finely divided polyimide powders from the foregoing reactants in a straightforward, facile manner.

The polyimide particles can be recovered by conventional means such as filtration, centrifugation, decantation or vacuum distillation of the reaction slurry. The so-recovered product can then be dried, with agitation under an inert gas stream or under vacuum. Various types of drying apparatus may be used for this purpose, including ribbon dryers, rotary vacuum driers, and the like. It is particularly preferred to conduct the drying of the agitated product initially under the flow of inert gas at ambient temperature and thereafter at a temperature in the range of 140° to 200° C. Further drying at 200° to 240° C. under full vacuum is typically conducted in order to remove residual quantities of solvent(s). Alternatively, the agitated product is dried under vacuum, initially at ambient temperature and thereafter at a temperature in the range of about 100° to about 250° C.

Before drying, the recovered polyimide particles may be washed with a suitable solvent having a boiling point below about 160° C. (preferably below about 100° C.). Thereafter the particles may be dried in the manner described above.

Another distinct advantage of this invention is that by use of tetrahydrofuran and/or alkylhydrofurans boiling below 100° C., water-based slurries of the particulate polyimide can readily be produced. In particular, the slurries of finely-divided polyimide in tetrahydrofuran and/or alkyltetrahydrofuran can be admixed with water, and the tetrahydrofuran and/or alkyltetrahydrofuran can be distilled off leaving an aqueous slurry of polyimide in water. Since tetrahydrofuran and the alkyltetrahydrofurans that boil below 100° C. have high water solubility, this operation enables the efficient removal such organic cyclic ether(s) by distillation. This in turn makes it possible to store, ship and handle the particulate polyimide powder in an aqueous medium such that exposure to concentrated organic media is avoided or greatly reduced, and fire hazards are minimized. Surfactants may be used to assist in forming stable aqueous dispersions of the particulate polyimide.

Aromatic tetracarboxylic acid dianhydrides which may be employed in the process may be represented by the formula

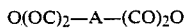

$O(OC)_2$—A—$(CO)_2O$ wherein A is an aromatic group. Illustrative compounds of this type include
pyromellitic acid dianhydride
3,3',4,4'-benzophenonetetracarboxylic acid dianhydride
4,4'-oxydiphthalic acid dianhydride
2,3,6,7-naphthalenetetracarboxylic acid dianhydride
1,2,5,6-naphthalenetetracarboxylic acid dianhydride
2,2-bis(3,4-dicarboxyphenyl)propane dianhydride
1,1-bis(3,4-dicarboxyphenyl)ethane dianhydride
bis(3,4-dicarboxyphenyl)methane dianhydride
3,4,9,10-perylenetetracarboxylic acid dianhydride
and the like, including mixtures of two or more such dianhydrides. Pyromellitic acid dianhydride and 3,3',4,4'-benzophenonetetracarboxylic acid dianhydride are particularly preferred reactants.

Suitable amounts of the corresponding tetracarboxylic acid monoanhydride may be present in the reaction system, either as the customary impurity in commercial grades of the dianhydride or as a deliberately added component. The amount present usually will not exceed about 10 mol % of the dianhydride. However, the monoanhydride may be used as a total or partial replacement of the dianhydride, if desired.

It is often desirable to control the molecular weight of the polyimide made by the process of this invention. Such control can be accomplished by incorporating a small amount of a monoanhydride in place of the dianhydride or of a small amount of a monoamine in place of the diamine. Such compounds can be referred to as end-capping agents. The amount of the end-capping agent used should not exceed about 10 mol percent (and preferably should be less than about 5 mol percent) based on dianhydride or diamine, respectively. Suitable end-capping agents include phthalic anhydride, 3,4-benzophenonedicarboxylic acid anhydride, aniline, aminobiphenyl, aminodiphenyloxide, and the like.

In lieu of or in addition to the tetracarboxylic acid dianhydride, use may be made of the free aromatic tetracarboxylic acid or its acid halides or esters as reactants in the process.

The diamine portion of the polymers is based on a 2,2-bis[4-(aminophenoxy)phenyl]hexafluoropropane, such as 2,2-bis[4-(3-aminophenoxy)phenyl]hexafluoropropane or 2,2-bis[4-(4-aminophenoxy)phenyl]hexafluoropropane, and mixtures thereof, as the sole or as the predominant (more than 50 mol %) diamine reactant used in producing the polyimide polymer. When forming co-polyimides wherein one or a mixture of 2,2-bis-[4-(aminophenoxy)phenyl]hexafluoropropanes constitute the prodominant aromatic primary diamine component, the balance (less than 50 mol %) of the aromatic diamine(s) used will be one or more aromatic or heterocyclic primary diamines such as
p-phenylenediamine
m-phenylenediamine
4,4'-diaminobiphenyl
3,3'-diaminobiphenyl
4,4'-methylenedianiline
4,4'-diaminodiphenylsulfide
3,3'-diaminodiphenylsulfide
4,4'-diaminodiphenylsulfone
3,3'-diaminodiphenylsulfone
4,4'-diaminodiphenylketone
3,3'-diaminodiphenylketone
4,4'-oxydianiline
3,3'-oxydianiline
1,4-diaminonaphthalene
2,6-diaminopyridine
3,5-diaminopyridine
2,6-diaminotoluene
2,4-diaminotoluene
1,1-bis(3-aminophenyl)ethane
2,2-bis(4-aminophenyl)propane
2,2-bis(3-aminophenyl)hexafluoropropane
2,2-bis(4-aminophenyl)hexafluoropropane
2,2-bis[4-(3-aminophenoxy)phenyl]hexafluoropropane
2,2-bis[4-(4-aminophenoxy)phenyl]hexafluoropropane
and the like.

The aromatic tetracarboxylic dianhydride and the aromatic primary diamines reactants used in the process are preferably employed in approximately equimolar proportions. Other proportions are permissible, however, as long as physical properties of the polymer are not adversely affected.

Examples of alkyltetrahydrofuran solvents which are suitable for use in the process include 2-methyltetrahydrofuran, 3-methyltetrahydrofuran, 2,5-dimethyltetrahydrofuran, and the like, including mixtures of two or more such solvents, with or without tetrahydrofuran itself. The preferred solvent medium for the process is tetrahydrofuran because of its very low boiling point, good solvency for the monomers, very high water solubility, relatively low cost, and ready availability.

While less preferred, other solvents, such as ketones, ethers, hydrocarbons, chlorohydrocarbons, and the like, boiling below 100° C. may be included in the homogeneous solutions formed in (a) above, provided that such co-solvents do not prevent the polyimide from precipitating from solution in proper physical form during the course of the ensuing thermal reaction in step (b). Such co-solvents should be distillable from water or co-distillable with water at temperatures below 100° C., and for best results should be water soluble.

In step (b) above, thermal energy is used to insure that a polyimide is formed, which, because of its insolubility in the solvent system, separates as a solid phase. In addition, the system is agitated strenuously enough (as by efficient stirring) to cause the polyimide to separate in particulate form and to prevent the formation of excessive quantities of agglomerated particles or masses within the system.

Temperatures used in step (b) will normally fall within the range of about 140° to about 210° C., and preferably within the range of about 140° to about 180° C., and most preferably within the range of about 140° to about 170° C.

As noted above, when it is desired to do so, the particulate polyimide polymer may be separated or recovered from the liquid reaction medium by any suitable procedure, such as filtration, decantation, vacuum distillation or centrifugation. In such cases it is usually desirable either to dry or to wash and dry the isolated particulate product. Any inert solvent boiling below about 160° C. (most preferably below about 100° C.) may be employed when washing the particulate product. Such solvents include low boiling paraffins, cycloparaffins, chlorinated solvents, ethers, esters, ketones, etc., and mixtures of such solvents. Preferred solvents for this use are tetrahydrofuran and the carboxylic acid esters (e.g., ethyl acetate) and alkylhydrofurans that boil below about 160° C. (most preferably below about 100° C.).

After drying the product with agitation under vacuum or under a flow of inert gas (preferably nitrogen, although argon, etc. may be used), preferably using staged drying temperatures in the manner described above, the particulate polyimide powder may be subjected to a final drying in a vacuum tray dryer at a temperature in the range of 140° to about 250° C. and at a pressure in the range of 0 to 20 mm Hg. Ordinarily grinding of the product is not required, but may be resorted to in any situation where it is deemed desirable.

Having described the basic concepts of this invention, reference will now be made to the following specific examples which are illustrative but not limitive of its practice.

EXAMPLE 1

To a 5-liter reactor were added 185.6 g (0.358 mol) of 2,2-bis[4-(4-aminophenoxy)phenyl]hexafluoropropane), 76.43 g (0.351 mol) of pyromellitic acid dianhydride, and 3535 g of HPLC grade, uninhibited tetrahydrofuran. The reactor was filled with nitrogen (47 psi) and sealed. This mixture was stirred for 2 hours while the temperature of an external oil bath was raised to and held at 132° C. such that the temperature of the reaction mixture was approximately 123° C. Then the oil bath temperature was increased to and held at 172° C. for 5 hours while continuously stirring the reaction mixture. During this time the temperature of the reaction mixture reached about 160°-161° C. and the pressure in the reactor reached 185 psi. The heating was then discontinued and the mixture allowed to cool to room temperature overnight while continuously stirring the contents of the reactor. The reactor was emptied by draining its contents (2956 g) and the reactor was rinsed out with two 2-liter quantities of tetrahydrofuran (3535 g total). The first such rinse weighed 2661 g (solids plus THF).

The second such rinse contained no solids and weighed 1656 g. The slurry composed of the drained reactor contents and the first of the two reactor rinses was placed in a 22 liter flask, an additional 962 g quantity of water was added, and the mixture was subjected to distillation to remove the THF as a THF-water azeotrope. When most of the liquids had been distilled off the product became viscous and pasty. Accordingly, additional quantities of water totalling 1084 g were added and the distillation was continued until all the THF had distilled off. The distilland was a stable, viscous aqueous slurry of particulate polyimide having a solids content of 0.5 weight percent. The polyimide yield was 93%. A portion of the slurry was dried under vacuum at 90° to 150° C. The particulate polyimide had an average particle size of 14.6 microns, with 10% of the product having a particle size less than 3 microns, 50% of the product having a particle size less than 8.9 microns, and 90% of the product having a particle size less than 37.1 microns. Small plaques were formed by compression molding the powder.

COMPARATIVE EXAMPLE A

To a dry 2-liter reactor was added 1166 g of material made by mixing 350 g of sieve dried xylenes with 841.6 g of a polyamic acid resin solution composed of 210 g of polyamic acid (made from pyromellitic acid dianhydride and 2,2-bis[4-(4-aminophenoxy)phenyl]hexafluoropropane) and 632 g of N-methylpyrrolidone. The reaction mixture was heated to 165° C. while stirred at the lowest speed possible. After 1 hr of stirring at 165° C. the reaction mixture had solidified into an agglomerated mass. The reaction mixture was allowed to stir and stand for a total of 3 hours at 165° C., cooled to 74° C. and allowed to stand overnight. The reactor did not drain; instead the contents had to be removed manually. The yellow solid was scraped from the reactor and stirred for 10 min in 1625 mL of n-heptane. The solids were filtered. The solids were stirred for 20 min in 2 liters of n-heptane. The solids were filtered and then dried overnight in a vacuum oven at 240°-260° C. and 0.3 mm Hg. There was obtained 185 g (94% yield) of a much darker yellow solid of clay-like consistency which was difficult to grind with a mortar and pestle. The ground material was screened (No. 30 ASTM sieve screen). Obtained were 172.3 g of powder and 2.0 g of material which would not pass through the screen.

COMPARATIVE EXAMPLE B

To a one-liter round bottom flask containing 185.3 g of EYMYD ® L-30N resin, a commercially available (Ethyl Corporation) 24 weight percent solids solution in N-methylpyrrolidone of polyamic acid from pyromellitic acid dianhydride and 2,2-bis[4-(4-aminophenoxy)-pheny]hexafluoropropane, was added 513.4 g of N-methylpyrrolidone. The slurry was heated to 190° C. for 3 hours while removing water by means of a Dean-Stark trap. After cooling to room temperature the slurry, which contained a dispersed fine yellow solid phase, did not show any signs of settling. An attempt was to filter the mixture using Whatman No. 2 filter paper, but this operation proceeded much too slowly to constitute a practical operation. Therefore the unfiltered mixture was poured into cyclohexane (1 liter) whereby a fine yellow precipitate settled to the bottom. Even so, this mixture could be filtered only very slowly through Whatman No. 2 filter paper. Accordingly, the mixture was then added to water which caused the formation of agglomerated particles of polymer which could be filtered off in a reasonable time period. The solids so recovered were dried in a vacuum oven and were found to be very difficult to grind to a powder because of their tough, granular consistency.

COMPARATIVE EXAMPLE C

Into a glass reactor equipped with a double spiral stainless steel agitator was charged 44.08 g of EYMYD® L-20N resin, a commercially available (Ethyl Corporation) 24 weight percent solids solution in N-methylpyrrolidone of polyamic acid from benzophenonetetracarboxylic acid dianhydride and 2,2-bis[4-(4-aminophenoxy)phenyl]hexafluoropropane. The reactor was partially immersed in an oil bath and the temperature was increased at the rate of 2.5° C. per minute. When the bath temperature reached 167° C., small bubbles appeared in the solution which, at this point, exhibited a relatively low viscosity. When the bath temperature reached 220° C., large gas bubbles appeared in the system and the mixture became viscous, gel-like and cloudy. At this point, the temperature of the bath was increased at the rate of about 0.5° C. per minute. The mixture gradually became extremely viscous and wrapped itself around the agitator. Heating was terminated when the bath temperature reached approximately 270° C. The reaction mixture was a non-uniform, very tough material which was wrapped around the double spiral stainless steel agitator. No powder resulted and this procedure was found totally unsuitable for producing the polyimide in particulate form. In fact, to remove the material from the agitator, it was found necessary to burn it off by placing the agitator with the material adhered thereto in a thermal oven and heating to 650° C. for a period of time long enough to completely burn off the polyimide polymer.

The above disclosure has been presented for purposes of illustration and not limitation. As can readily be appreciated by those skilled in the ar, this invention is susceptible to considerable variation in its practice within the spirit and scope of the ensuing claims.

What is claimed is:

1. A process for the production, in particulate form, of aromatic polyimides derived from a 2,2-bis[4-(aminophenoxy)phenyl]hexafluoropropane as the sole or predominant aromatic primary diamine component thereof, which process comprises forming a solution of a substantially equimolar mixture of (1) an aromatic tetracarboxylic dianhydride and (2) a 2,2-bis[4-(aminophenoxy)phenyl]hexafluoropropane as the sole or predominant aromatic diamine in (3) a solvent composed of (i) tetrahyurofuran, or (ii) one or more alkyltetrahydrofurans having a normal boiling point below 100° C., or (iii) a mixture of (i) and (ii), and heating and agitating such solution in a closed reaction system under superatmospheric pressure such that a separate phase of particulate aromatic polyimide is formed therein.

2. A process of claim 1 wherein the 2,2-bis[4-(aminophenoxy)phenyl]hexafluoropropane is 2,2-bis[4-(4-aminophenoxy)phenyl]hexafluoropropane and the aromatic tetracarboxylic acid dianhydride is benzophenonetetracarboxylic acid dianhydride or pyromellitic acid dianhydride, or both.

3. A process of claim 2 wherein the solvent is tetrahydrofuran.

4. A process for the production, in particulate form, of aromatic polyimides derived from a 2,2-bis[4-(aminophenoxy)phenyl]hexafluoropropane as the sole or predominant aromatic primary diamine component thereof, which process comprises:
(a) forming a homogeneous solution from (1) an aromatic tetracarboxylic dianhydride, (2) a 2,2-bis[4-(aminophenoxy)phenyl]hexafluoropropane, in (3) from about 5 to about 50 parts by weight per part by weight of reactants (1) and (2) combined, of a solvent composed of (i) tetrahydrofuran, or (ii) one or more alkyltetrahydrofurans having a normal boiling point below 100° C., or (iii) a mixture of (i) and (ii); and
(b) heating such solution with agitation in a closed reaction system under super-atmospheric pressure and to a temperature sufficient to cause imidization and formation of a separate phase of particulate aromatic polyimide.

5. A process of claim 4 wherein the solvent is tetrahydrofuran.

6. A process of claim 4 wherein the 2,2-bis[4-(aminophenoxy)phenyl]hexafluoropropane is 2,2-bis[4-(4-aminophenoxy)phenyl]hexafluoropropane and the aromatic tetracarboxylic acid dianhydride is benzophenonetetracarboxylic acid dianhydride or pyromellitic acid dianhydride, or both.

7. A process of claim 6 wherein the solvent is tetrahydrofuran.

8. A process of claim 4 wherein said homogeneous solution in (a) is initially formed at ambient temperature.

9. A process of claim 4 further comprising recovering the particulate aromatic polyimide and drying the particulate aromatic polyimide with agitation under an inert gas stream or under vacuum.

10. A process of claim 9 wherein the drying is conducted initially at ambient temperature and thereafter at a temperature in the range of about 140° to about 240° C.

11. A process of claim 9 wherein prior to drying, the recovered particulate aromatic polyimide is washed with a solvent having a boiling point below about 160° C.

12. A process of claim 11 wherein the boiling point of the solvent used in the washing operation is below about 100° C.

13. A process of claim 9 wherein the 2,2-bis[4-(aminophenoxy)phenyl]hexafluoropropane is 2,2-bis[4-(4-aminophenoxy)phenyl]hexafluoropropane and the aromatic tetracarboxylic acid dianhydride is benzophenonetetracarboxylic acid dianhydride.

14. A process of claim 9 wherein the 2,2-bis[4-(aminophenoxy)phenyl]hexafluoropropane is 2,2-bis[4-(4-aminophenoxy)phenyl]hexafluoropropane and the aromatic tetracarboxylic acid dianhydride is pyromellitic acid dianhydride.

15. A process for the production of aromatic polyimides in particulate form which comprises:
(a) forming a homogeneous solution from (1) an aromatic tetracarboxylic dianhydride, (2) a 2,2-bis[4-(aminophenoxy)phenyl]hexafluoropropane, in (3) from about 5 to about 20 parts by weight per part by weight of reactants (1) and (2) combined, of a solvent having a normal boiling point below 100° C. composed of (i) tetrahydrofuran, or (ii) one or more alkyltetrahydrofurans having a normal boiling point below 100° C., or (iii) a mixture of (i) and (ii);
(b) heating such solution with agitation in a closed reaction system under super-atmospheric pressure and to a temperature sufficient to cause imidization and formation of a separate phase of particulate aromatic polyimide;

(c) mixing the particulate aromatic polyimide with water to dissolve out the solvent (i), (ii) or (iii) used; and (d) distilling said solvent from the mixture of particulate aromatic polyimide and water.

16. A process of claim 15 wherein the 2,2-bis[4-(aminophenoxy)phenyl]hexafluoropropane is 2,2-bis[4-(4-aminophenoxy)phenyl]hexafluoropropane and the aromatic tetracarboxylic acid dianhydride is benzophenonetetracarboxylic acid dianhydride.

17. A process of claim 15 wherein the 2,2-bis[4-(aminophenoxy)phenyl]hexafluoropropane is 2,2-bis[4-(4-aminophenoxy)phenyl]hexafluoropropane and the aromatic tetracarboxylic acid dianhydride is pyromellitic acid dianhydride.

18. A process of claim 15 wherein the solvent is essentially pure tetrahydrofuran.

* * * * *